United States Patent Office 3,370,382
Patented Feb. 27, 1968

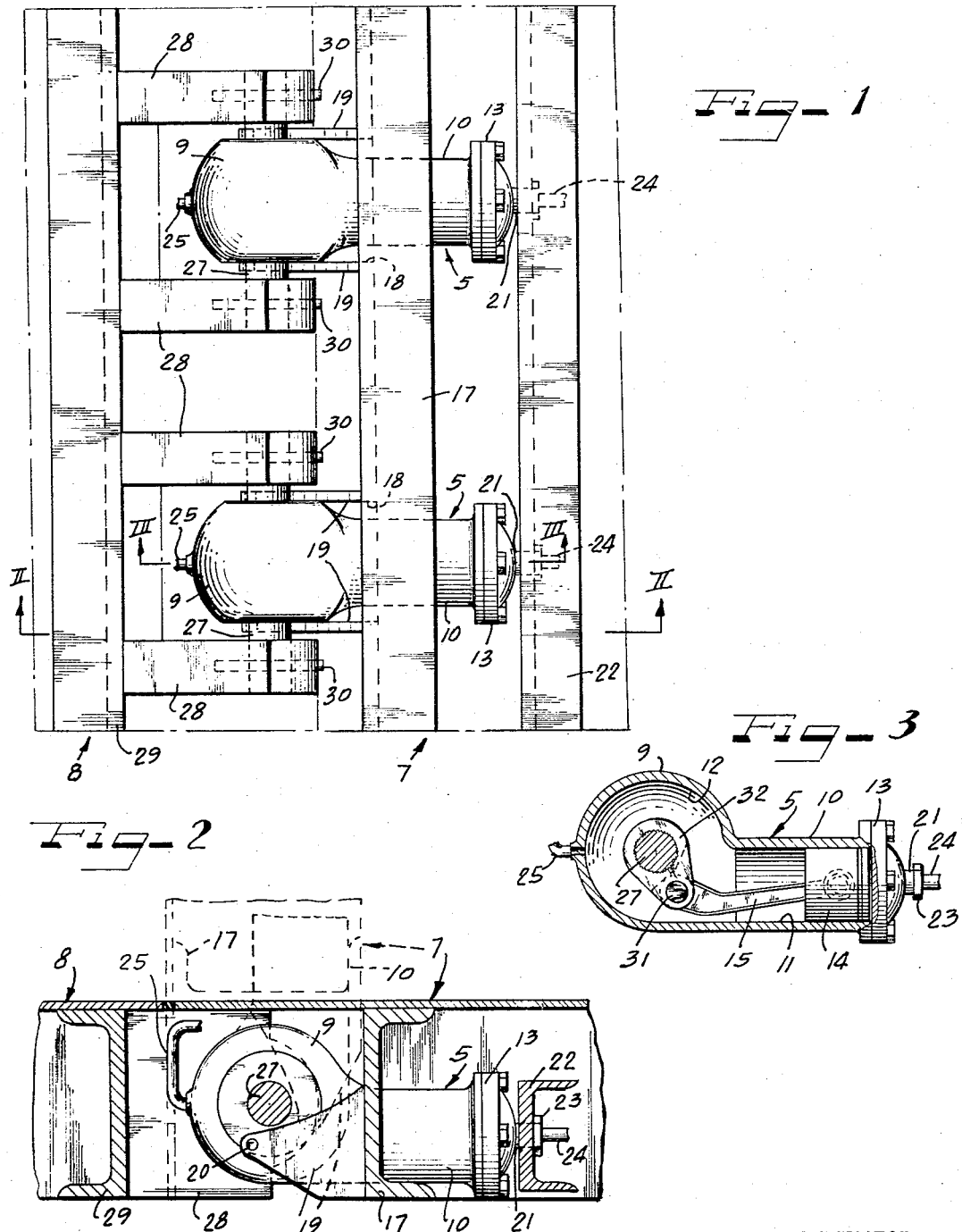

3,370,382
HATCH COVER WITH PISTON LEVER
ROTARY ACTUATORS
Rollin Douglas Rumsey, Buffalo, N.Y., assignor to Houdaille Industries, Inc., Buffalo, N.Y., a corporation of Michigan
Filed Sept. 20, 1965, Ser. No. 488,573
8 Claims. (Cl. 49—340)

ABSTRACT OF THE DISCLOSURE

In an assembly comprising a fixed structure having an opening therein such as a hatchway and a cover movable about a hinge axis at a joint between closing and open positions with respect to the opening, one or more crank lever rotary actuators selectively effect opening and closing movements with the head portion of the actuator rotatably mounted on a shaft non-rotatably fixed to the structure on the hinge axis while a tubular crank arm portion of the actuator is fixed to the cover, with reaction means operating between the shaft and the actuator within the actuator to cause swinging movement selectively about the shaft to effect corresponding opening and closing movements of the cover.

---

This invention relates to improvements in means for the efficient power operation of hatch covers, doors, and the like, and more particularly concerns the efficient opening and closing of such closures by means of piston-lever rotary actuators.

Actuation of the generally fairly heavy movable sections of hatch covers, for example, between open and closed position has heretofore been effected by various devices using cables, winches, gears, cylinders and piston rods, levers, and the like, some having advantages over others for various reasons. Such devices, however, have involved complexities, exposed mechanisms, parts projecting out of or away from the movable closer sections, and other objectionable features. Hydraulic devices have often been objectionable due to exposure of bearing surfaces to contamination and corrosion, inability to withstand hard usage, etc.

An important object of the present invention is to provide new and improved means for efficient power operation of hatch covers and the like and overcoming the various shortcomings and deficiencies of prior constructions.

Another object of the invention is to provide a new and improved power actuator assembly for opening and closing heavy closures such as hatch covers and wherein the actuator structure is entirely housed within the frame of the cover.

A further object of the invention is to provide a new and improved powered hinge for hatch covers in which the actuating means comprise part of the hinge structure.

Still another object of the invention is to provide new and improved hatch cover actuating means mounted on the deck or coaming of the hatchway.

Yet another object of the invention is to provide new and improved hatch cover actuating means wherein the shaft structure of a rotary actuator comprises the hinge axis and is efficiently located substantially midway between the top and the bottom of the hatch cover in the hinge joint between the cover and the deck or coaming.

According to the principles of the invention, means for moving a cover between closing and open positions about a hinge axis at a joint along an edge of an opening of a fixed structure comprise a crank lever rotary actuator having a rigid envelope including a hollow head portion and a tubular crank lever arm portion extending therefrom and defining a cylinder therein, with means securing the arm portion to the cover with the head portion extending into the joint where it is rotatably mounted on a fixed shaft which is non-rotatably mounted on the fixed structure in the joint and defines the hinge axis, whereby the shaft and the actuator provide a hinge for the cover. Means in the cylinder and on the shaft are operable to effect a torque reaction between the shaft and the actuator whereby the arm portion of the actuator is caused to swing selectively about the hinge axis and correspondingly effects movement of the cover between the closing and open positions.

Other objects, features and advantages of the present invention will be readily apparent from the following detailed description of a preferred embodiment thereof taken in conjunction with the accompanying drawing, in which:

FIGURE 1 is a fragmentary plan view of a deck and hatch cover assembly including rotary actuators for the cover.

FIGURE 2 is a sectional elevational detail view taken substantially on the line II—II of FIGURE 1; and FIGURE 3 is a longitudinal sectional view through one of the hatch cover actuators taken substantially on the line III—III of FIGURE 1.

In the illustrated embodiment of the invention piston lever rotary actuators 5 are mounted in the hinge edge portion of a hatch cover 7 and along the hatchway edge of a deck or coaming 8 and constructed and arranged to move the hatch cover between closed position as shown in full line and open position as indicated in broken outline, through a range of movement of about 90°.

Each of the hatch actuators 5 comprises a rugged preferably unitary cast metal body including as nearly as practicable spherical hollow head portion 9 and aligned therewith in a generally tangential relation a tubular cylinder actuating crank lever portion 10 affording a cylinder chamber 11 opening at one end into a head chamber 12. At its opposite open end, the cylinder 11 is closed by an end cap 13 secured as by bolting onto the end of the lever portion 10. Longitudinally reciprocable in the cylinder 11 is a piston 14 to which is connected as by customary wrist pin means a piston rod link 15 of generally dogleg or banana shape and of a length to extend into the head chamber 12 when the piston 14 is located at the outer end of the cylinder 11.

Mounting of the actuator 5 in each instance is desirably effected in a manner which maintains it entirely within the preferred thickness dimension of the hatch cover 7 as defined by the cover frame work generally comprising metal beams and in this instance including a beam 17 adjacently parallel to the joint between the hatch cover and the deck structure 8. To this end, the frame beam 17 is provided with a suitable clearance opening 18 through which the lever portion 10 is received with the head portion projecting outwardly and into a position across the joint. Stable attachment of the head portion 9 to the cover frame work is effected by means comprising a pair of brackets 19 conveniently in the form of parallel coextensive plates rigidly mounted on the beam 17 and projecting outwardly alongside and secured as by means of respective pins or bolts 20 to the opposite sides of the head 9 and as far as practicable outwardly relative to the frame bar 17. At its inner end, the elongated actuator is fixedly secured to the frame of the cover 7 as by means of a boss 21 extending outwardly on the end cap 13 and projecting through an anchor beam or bar 22 on the cover frame work, to which the boss is secured as by means of a nut 23. Through this arrangement, each of the actuators 5 is secured in a stable, well protected relation on and within the frame confines of the cover 7.

Operation of the actuators 5 to effect opening and closing movements of the cover 7 is effected by hydraulic pressure introduced into the cylinder 11 between the crown or head of the piston 14 and the end cap or cylinder head 13 for the opening action and by introducing pressure against the back end of the piston 14 for the closing action. Head end hydraulic pressure is introduced through the cylinder head 13 as by means of a supply pipe 24 connected through the boss 21 which serves also as a hydraulic line connecting nipple for this purpose. Hydraulic fluid for cover closing actuation is introduced conveniently through the head as by means of a supply pipe 25 communicating with the chamber 12 and then the inner end of the cylinder 11. The actuator thus will be constantly filled with the hydraulic fluid with pressure introduction and bleed off being alternately effected through the hydraulic conduits 24 and 25 suitably integrated in a hydraulic control system.

Means are provided to cause the actuators 5 to act as crank levers in their hatch cover opening and closing function. To this end, the head portion 9 of each of the actuators 5 is rotatably mounted on a fixed hinge axis shaft 27 which is fixedly carried by the deck structure 8 in the hinge joint between the cover 7 and the deck structure 8 which, as previously pointed out, may be a coaming. Although the shaft 27 may for convenience be a separate relatively short shaft for each of the actuators, it may, if preferred, be a longer, continuous shaft serving a plurality of the actuators. In this instance the shaft 27 is carried by a pair of coextensive parallel spaced shaft blocks or brackets 28 rigidly mounted on the deck framing as to a beam 29. Means to retain the shaft 27 fixed against rotation may comprise pins 30 mounted in the brackets 28 and extending through the respective end portions of the shaft, although other types of keying or fixing means may be employed.

A torque reaction between the actuator 5 and the associated shaft 27 is effected by connection of the piston rod 15 of the actuator in torque thrust relation to the shaft 27. This is effected by connection of the end portion of the piston rod 15 in the chamber 12 by means of a wrist pin 31 to a torque arm 32 fixedly splined over the shaft 27. In implementation of the torque reaction, the axis of the shaft 27 is offset to a predetermined extent from the axis of the cylinder 11, although these axes are located in planes normal to one another. From the shaft 27, the torque arm 32 projects across the cylinder axis and is angled toward the adjacent end of the cylinder in the closed condition of the cover 7. As a result, upon introduction of hydraulic pressure fluid between the cylinder head and the piston 14, the piston 14 being anchored through the piston rod 15 to the reaction torque arm 32 and thus unable to move away from the cylinder head, while the actuator housing or envelope is pivotally mounted on the shaft 27, the cylinder head 13, in effect, reacts to move away from the piston and a torque reaction develops between the crank arm 10 and the piston 14 with a major component of force driving in the opposite direction to the direction in which the torque arm 32 projects from the shaft 27, namely in the opening direction of the cover 7. At the full open position, or in any intermediate position, the cover 7 may be hydraulically locked through the actuators 5. Closing of the cover 7 is effected by reversing the actuators by introducing the hydraulic fluid through the head chambers 12 thereof, causing a reverse torque reaction to develop in the crank lever portion 10.

From the foregoing, it will be apparent that the actuators 5 provide efficient powered hinge means for the hatch cover in a simple, rugged construction. All operating parts are fully enclosed within the actuator envelopes. Torque load and thrust is efficiently imparted by each of the actuators to the cover structure through the efficient, balanced attachment of the opposite end portions of the actuator to the frame structure of the cover. The actuators afford actuating crank effectiveness which is of maximum length within the available space within which the actuators are wholly accommodated. Maximum efficiency in utilization of power input is attained by having the actuators attached to the cover frame as close as practicable to the lower side of the hatch cover frame and below the hinge axis.

It will be understood that modifications and variations may be effected without departing from the scope of the novel concepts of the present invention.

I claim as my invention:

1. In an assembly comprising a fixed structure having an opening therein and a cover movable about a hinge axis at a joint between closing and open positions with respect to said opening:

a crank lever rotary actuator comprising a rigid envelope including a hollow head portion defining a chamber therein and a tubular crank arm portion defining a cylinder therein opening at one end into said chamber, a cylinder head closing the opposite end of said cylinder, a piston mounted in reciprocal relation within said cylinder, a shaft rigidly non-rotatably mounted on said fixed structure in said joint and defining said hinge axis for the cover, said head portion being pivotally mounted on said shaft which extends from side-to-side through said head portion chamber, a torque arm fixed on said shaft within said head portion chamber, means fixedly connecting said crank arm portion to said cover, and means for introducing pressure fluid into the actuator to act on either end of the piston to drive said piston and said crank arm portion relatively and thereby effect cranking torque reaction between said piston and said crank arm portion and said torque arm to move the actuator about said shaft hinge axis to move the cover between said closing and open positions.

2. In an assembly comprising a fixed structure having an opening therein and a cover movable about a hinge axis at a joint between closing and open positions with respect to said opening:

a crank lever rotary actuator comprising a rigid envelope including a hollow head portion defining a chamber therein and a tubular crank arm portion defining a cylinder therein opening at one end into said chamber, a cylinder head closing the opposite end of said cylinder, a piston mounted in reciprocal relation within said cylinder, a shaft rigidly non-rotatably mounted on said fixed structure in said joint and defining said hinge axis for the cover, said head portion being pivotally mounted on said shaft which extends from side-to-side through said head portion chamber, a torque arm fixed on said shaft within said head portion chamber, means for introducing pressure fluid into the actuator to act on either end of the piston to drive said piston and said crank arm portion relatively and thereby effect cranking leverage torque reaction between said piston and said crank arm portion and said torque arm to move the actuator about said shaft hinge axis, and means securing the actuator to said cover comprising means securing both said crank arm portion and each side of said head portion in fixed stabilized relation whereby the actuator moves the cover about said shaft hinge axis when the actuator is moved about the shaft hinge axis.

3. In an assembly comprising a fixed structure having an opening therein and a cover movable about a hinge axis at a joint between closing and open positions with respect to said opening:
- a crank lever rotary actuator comprising a rigid envelope including a hollow head portion and a tubular crank lever arm portion extending therefrom and defining a cylinder therein, means securing said arm portion to said cover with the head portion extending into said joint,
- a fixed shaft non-rotatably mounted on said fixed structure in said joint and defining said hinge axis and extending through said head portion from side to side and thereby pivotally mounting said head portion on said fixed structure whereby the shaft and the actuator provide a hinge for the cover,
- and means in said cylinder and on said shaft operable to effect a torque reaction between said shaft and the actuator whereby said arm portion is caused to swing about said axis and correspondingly effects movement of the cover between said closing and open positions.

4. In an assembly comprising a fixed structure having an opening therein and a cover movable about a hinge axis at a joint between closing and open positions with respect to said opening:
- a crank lever rotary actuator comprising a rigid envelope including a hollow head portion defining a chamber therein and a tubular crank lever arm portion extending therefrom and defining a cylinder therein opening at one end into said chamber,
- a cylinder head closing the opposite end of said cylinder,
- means securing said arm portion to said cover with the head portion extending into said joint,
- a fixed shaft non-rotatably mounted on said fixed structure in said joint and defining said hinge axis and extending through said head portion from side to side and thereby pivotally mounting said head portion on said fixed structure whereby the shaft and the actuator provides a hinge for the cover,
- and means for driving said actuator rotatably about said shaft comprising a piston in said cylinder with its head adjacent to said cylinder head in the closing position of the cover and having a piston rod connected by a wrist pin and extending into said head portion chamber,
- said shaft axis being in a plane normal to a plane through the cylinder axis but offset from the cylinder axis toward the side of the cover toward which the cover moves toward open position,
- and a torque arm rigid on the shaft in said chamber and extending across the cylinder axis and toward the cylinder and having a wrist pin connection with the piston rod,
- whereby pressure fluid introduced into said cylinder between said cylinder head and the piston effects a driving torque reaction causing the crank lever arm portion to move toward cover opening position and thereby effecting rotation of the actuator about the shaft and opening of the cover.

5. In an assembly comprising a fixed structure defining an opening therein and a cover member for closing said opening and hingedly movable between closed and open positions about a joint along an edge of said fixed structure defining said opening:
- shaft means defining a hinge axis in said joint,
- means fixedly non-rotatably mounting said shaft means on said edge,
- a plurality of actuators located at spaced intervals along said joint each having a rigid housing provided with a hollow head portion pivotally mounted on said shaft means and a hollow crank lever arm portion projecting from said head portion and supportingly fixedly secured to said cover member,
- and torque reaction means mounted on said shaft means and in said head portions and said arm portions and operative to drive said actuators rotatably about said shaft means and thereby operative to move said cover member between said open and closed positions.

6. An assembly as defined in claim 5, in which said shaft means comprise a separate short shaft extending respectively through the head portion of each of the actuators, and a respective pair of spaced supporting bracket blocks rigidly mounted on the fixed structure carrying each shaft and to which the shaft is non-rotatably secured.

7. In a hatch and cover construction of the character described including a hatchway defined by a frame and a cover for closing the hatchway and including a frame with portions of the frames in adjacency and on opposite sides of a hinge joint about which the cover is movable between open and closed positions relative to the hatchway frame:
- a hinge axis shaft fixedly non-rotatively mounted on the hatchway frame and located in said joint,
- an actuator including a head portion rotatably mounted on said shaft and a lever crank arm portion extending from the head portion into the cover frame and operative to swing about said shaft and carry the cover between said opening and closing positions,
- means securing said arm portion to said cover frame,
- and a pair of stabilizing and securing bracket members rigid with the cover frame and secured to the respective opposite sides of said head portion adjacent to said shaft.

8. An assembly as defined in claim 7, in which the cover faces upwardly, and said bracket members extend past the lower side of the shaft in the closed position of the cover and are secured to the head portion at points offset toward the hatchway frame relative to a vertical plane through the axis of the shaft.

References Cited

UNITED STATES PATENTS

| | | | |
|---|---|---|---|
| 2,996,047 | 8/1961 | Denniston | 49—340 X |
| 3,118,310 | 1/1964 | Jablonsky | 74—105 |
| 3,288,202 | 11/1966 | Rumsey | 160—188 |

DAVID J. WILLIAMOWSKY, *Primary Examiner.*

PETER M. CAUN, *Examiner.*